United States Patent
McCubbin et al.

(10) Patent No.: US 7,272,492 B2
(45) Date of Patent: Sep. 18, 2007

(54) PATH PLANNING FOR MINE COUNTERMEASURES

(75) Inventors: Christopher B. McCubbin, New Market, MD (US); Christine D. Piatko, Columbia, MD (US); Steven J. Marshall, Baltimore, MD (US); Jessica L. Pistole, Baltimore, MD (US); Cheryl L. Resch, Columbia, MD (US); Paul McNamee, Ellicott City, MD (US)

(73) Assignee: The Johns Hopkins University, Baltimore, MD (US)

( * ) Notice: Subject to any disclaimer, the term of this patent is extended or adjusted under 35 U.S.C. 154(b) by 291 days.

(21) Appl. No.: 11/080,143

(22) Filed: Mar. 15, 2005

(65) Prior Publication Data

US 2007/0038366 A1     Feb. 15, 2007

Related U.S. Application Data

(60) Provisional application No. 60/553,521, filed on Mar. 16, 2004.

(51) Int. Cl.
*G01C 21/00* (2006.01)
(52) U.S. Cl. .................... 701/202; 701/200; 701/23
(58) Field of Classification Search ........ 701/200–202, 701/207–208, 211, 213–214, 23, 25; 340/988; 342/357.06, 357.12
See application file for complete search history.

(56) References Cited

U.S. PATENT DOCUMENTS

| | | | |
|---|---|---|---|
| 5,835,901 A | 11/1998 | Duvoisin, III et al. | |
| 5,956,250 A * | 9/1999 | Gudat et al. | 701/26 |
| 5,999,881 A | 12/1999 | Law et al. | |
| 6,255,793 B1 * | 7/2001 | Peless et al. | 318/580 |
| 6,259,988 B1 | 7/2001 | Galkowski et al. | |
| 6,577,947 B1 | 6/2003 | Kronfeld et al. | |
| 6,785,610 B2 | 8/2004 | Baker et al. | |
| 6,850,024 B2 * | 2/2005 | Peless et al. | 318/580 |
| 7,010,412 B1 * | 3/2006 | Song | 701/80 |
| 7,191,060 B2 * | 3/2007 | Makela | 701/209 |
| 2004/0193349 A1 | 9/2004 | Flann et al. | |

* cited by examiner

*Primary Examiner*—Yonel Beaulieu
(74) *Attorney, Agent, or Firm*—Benjamin Y. Roca

(57) ABSTRACT

An apparatus for mine avoidance that enables a battle group commander to rapidly detect, classify, and identify mines, and form a tactical picture of mined areas. The system is enabled by a graphical user interface which generates a display of the minefield and an avoidance path which is calculated by a rapidly-explored random trees algorithm interacting with algorithms defining avoidance object spaces inserted by an operator in two or three dimensions and transit vehicle characteristics. The apparatus enables a method which establishes the parameters of an area representing a minefield. The area is then populated with obstacle spaces whose areas are functions of the probability of the existence of a mine and through which an avoidance route through the minefield may not pass. The start and end points of the avoidance route are entered on a graphic display of the minefield and an avoidance path there between is calculated and presented as an avoidance route.

10 Claims, 3 Drawing Sheets

PATH PLANNING FOR MINE COUNTERMEASURES

CROSS-REFERENCE TO RELATED APPLICATIONS

This application claims the benefit of prior filed co-pending U.S. application Ser. No. 60/553,521, filed on Mar. 16, 2004.

STATEMENT OF GOVERNMENTAL INTEREST

This invention was made with Government support under Contract No. N00024-98-D-8124 awarded by the Office of Naval Research. The Government has certain rights in the invention.

BACKGROUND OF THE INVENTION

Battle group commanders have a need to develop low risk paths through minefields and evaluate alternative route options. To satisfy this need, they require planning aids which will develop paths that balance the utility and risk associated with different routes. They need tools for minefield transit planning which integrate path risk, path time, and dynamic and kinematic concerns.

FIELD OF THE INVENTION

The present invention relates to applications of path planning algorithms for quantitatively evaluating potential paths through minefields.

DISCUSSION OF THE RELATED ART

Attempts have been made to solve problems similar to those faced by commanders needing to pass through a minefield but they have not addressed the specific problems associated with such a transit. For instance, H. Duvoisin, III, et al, in U.S. Pat. No. 5,835,901 for "Perceptive System Including a Neural Network", issued Nov. 10, 1998, teaches the use of a target location and classification system for mines in a minefield but fails to suggest an avoidance system.

U.S. Pat. No. 5,999,881 issued to C. Law, et al, for "Automated Path Planning" on Dec. 7, 1999, presents a path planning method which considers avoidance of a plurality of obstacles, but the patent is not concerned with mines or the problems inherent in the transition of a minefield by a battle group.

Route planning is addressed by P. Galkowski, et al, in U.S. Pat. No. 6,259,988 for "Real-Time Mission Adaptable Route Planner," issued Jul. 10, 2001, but it is concerned with fixed navigational obstacles, not a dynamic situation involving a minefield. It employs a grid based route optimization method for determining the most economical path between two fixed points while the present need requires an ability to chart a path between dynamic points.

OBJECTIVES OF THE INVENTION

The primary objective of the invention is to provide a means for mine avoidance that enables a battle group commander to rapidly detect, classify, and identify mines, and form a tactical picture of mined areas.

Another objective is to integrate algorithms defining avoidance object space in two and three dimensions with transit vehicle characteristics algorithms for quantitatively evaluating potential paths through minefields.

A further objective is to integrate path planning Rapidly-explored Random Trees algorithms with algorithms defining avoidance object space in three dimensions.

A still further objective is to integrate path planning Rapidly-explored Random Trees algorithms with algorithms defining avoidance object space in two dimensions.

Another objective is to integrate path planning Rapidly-explored Random Trees algorithms with algorithms defining vehicle characteristics for quantitatively evaluating potential paths through minefields.

A further objective is to provide path planning techniques to develop paths that balance the utility and risk associated with different routes through a minefield.

Another objective is to integrate path risk, path time, and dynamic and kinematic concerns to plan paths through minefields.

SUMMARY OF THE INVENTION

A method and apparatus for developing potential routes through a minefield and assessing risk and economy factors for each route is provided by a group of interacting algorithms having inputs and final solution outputs provided by a graphic user interface. The preferred embodiment of the present invention combines Rapidly-explored Random Trees algorithms with algorithms defining avoidance object space in at least two dimensions and transit vehicle characteristics algorithms.

The software system consists of four separate programs, 1) a general path planner for all of the executive interfacing of outside systems with planning algorithms and store a consistent world-view database which is updated by outside systems and used by system planning algorithms, 2) a path planning algorithm for the mines domain, 3) a Rapidly-explored Random Trees, RRT, package which contains several closely related algorithms for producing avoidance plans, and 4) the GUI program which drives a graphical user interface and provides input to and output from the general path planner program.

The hardware is comprised of computing means using a Java SKD 1.4 platform to run and integrate the software programs and a graphical user interface, GUI.

DESCRIPTION OF THE PREFERRED EMBODIMENT

Figure 1:
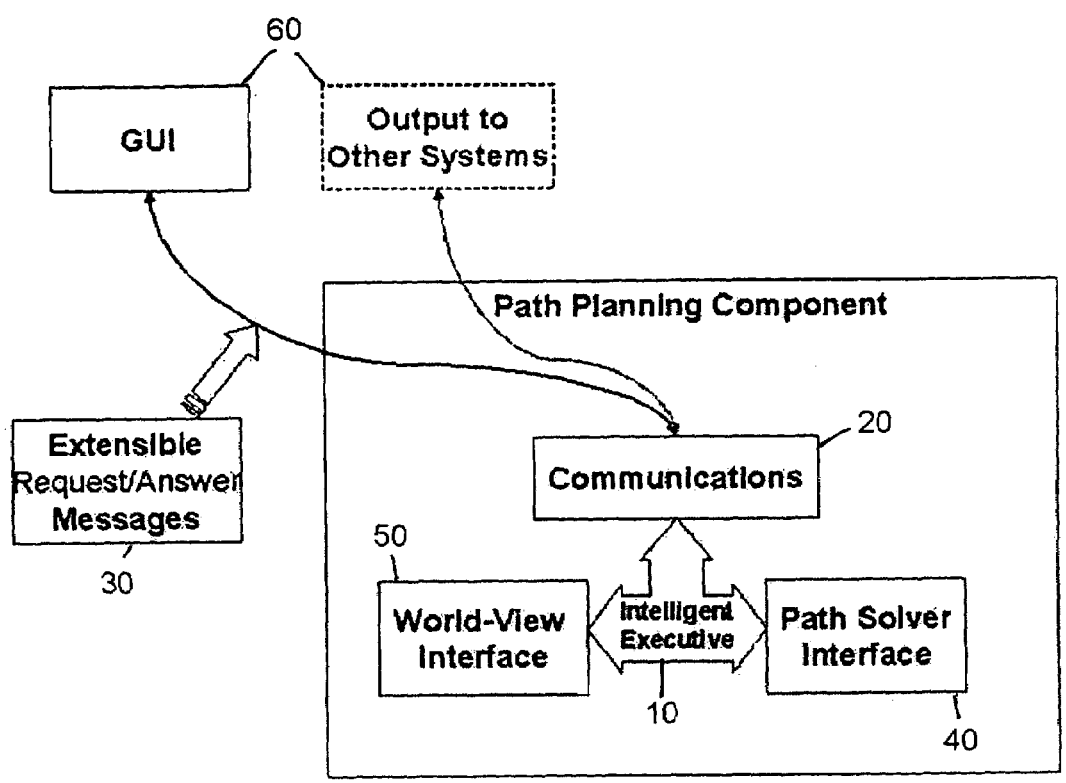
FIG. 1 is a block diagram of the general path planner.

The general path planner program is the heart of the system. It performs the algorithmic processing of the data input through the graphical interface. A block diagram of the general path planner is presented in FIG. 1 which illustrates the interaction of the several code groups required to implement the system. The executive code group 10, the communications code group 20, the messages code group 30, the path solver code group 40, the World-View code group 50, and the GUI/output code group 60. Each of these groups performs one or more related tasks within the system. The overall architecture of the system is a single threaded, message-driven server architecture. Each message received is processed in turn, without threading. Output is sent back through the use of an observer design pattern, much like Java=s generator-listener mechanisms for GUIs. The system uses a command design pattern, where messages contain their handling code as methods. The system may be implemented on a platform such as the Java SKD 1.4 and the basic path planning algorithms are variants of the Rapidly-explored Random Trees algorithm described by S. M. LaValle in a paper titled, "Rapidly-exploring Random Trees: A new tool for path planning," published as TR 98-11 by the Computer Science Dept., Iowa State University, in October 1998. The paper is incorporated herein by reference.

The executive code group 10 is the container classes for all of the statically-held objects in the system. The objects in this group act as traffic cops to the other code groups, and initialize objects that require initialization at startup time.

The communications code group 20 handles all I/O for the system. It contains an incoming message queue which is polled to see if new messages have arrived. Once messages arrive, they are executed in the order they arrive, one at a time. The Communications group also holds all of the output message generators that the system creates. These message generators send the output messages created by the system to registered listeners as soon as the output message arrives. Input messages contain their handling code in an overridden execute abstract method. In this way, new input message types, i.e. commands, can be added easily by creating a new message class and defining the code to handle that message. Messages also contain a halt method, which will be called if a special halt method is called on the path planning component. The halt method can be used to safely stop current message execution.

The path solvers code group 40 represents path-planning package interfaces that the system can use. In the preferred embodiment the path-planning solvers are based on RRT algorithms. The solver is able to set its state using a World-View object plan given a set of way points and halt its planning if has to. Also included in this group is a reflective method to set a planner=s parameters when given a list of parameter names and values. The set parameters method looks for methods in the planner class which have "set" prepended to the parameter name and take the object corresponding to the parameter name as the sole argument. It then executes that method on the passed-in argument object.

The World-View code group 50 is in charge of holding a database of world objects, such as mines, bathymetry data, shorelines, etc. The World-View interface is fairly empty, and only has a clear method on it. In the preferred embodiment the only World-View implementation is the Mines Only World-View, which is simply a list of mine locations and probabilities on the plane. This preferred embodiment is presented as exemplary, additional embodiments are anticipated to expand the versatility of the system.

The Output Code Group 60 is in charge of supplying output to interested parties. It uses the observer design pattern, and is modeled after Java AWT=s event system. There are message event generators for each type of output method produced, and listener interfaces that listening classes must implement to receive the output. There are two generators: a generator for path solutions, and a generator for algorithm progress messages.

The preceding code groups are operational in any one of three different modes or use cases which are defined by the input message type. The use cases are: administrative use-case, state use-case, and path query. To perform a use-case, a corresponding message is sent to the system through the communications group.

The administrative use-case is intended to be used to send high-level commands to the system. It operates reflectively so that an administrative message is created with a string representing one of the methods defined on the administrative message class. When sent to the system, the method named by the string will be invoked inside the system. Current administrative messages include: printing the administrative message (a debugging tool), printing the World-View, clearing the World-View, and exiting the program. New commands can be added by simply adding a method to the administrative class.

The state use-case message is used to update the current state held in the system=s World-View. Simple-State, a subclass of state use, is used with the Mines-Only World-View, and contains a list of added or a list of deleted mines (but not both). To execute this use-case, the Simple-State message either adds or deletes its contents to the World-View, as appropriate.

The path query message defines the use-case of requesting a path solution by the system. It is parameterized by the name of the algorithm desired, algorithm parameters, and a list of waypoints to be followed for the path. The first waypoint is the start point and the last waypoint is the goal point. If less than two waypoints are present, behavior is undefined. The path query execution involves the following steps: 1) A path planner solver is fetched or created for the desired algorithm. 2) The planner is loaded with the current World-View state. 3) Any parameters present are loaded into the algorithm. 4) The planning algorithm is executed with the passed waypoints. 5) If a solution is returned, it is sent to the solution event generator in the communications code group 20.

The GUI incorporates a means for linking designated portions of a display with an electronic address. It provides an interface with the multi-algorithm capabilities of the general path planner architecture while providing an interactive view of plan progress and an intuitive means to design World-View configurations. The GUI performs its tasks sequentially.

Figure 2:
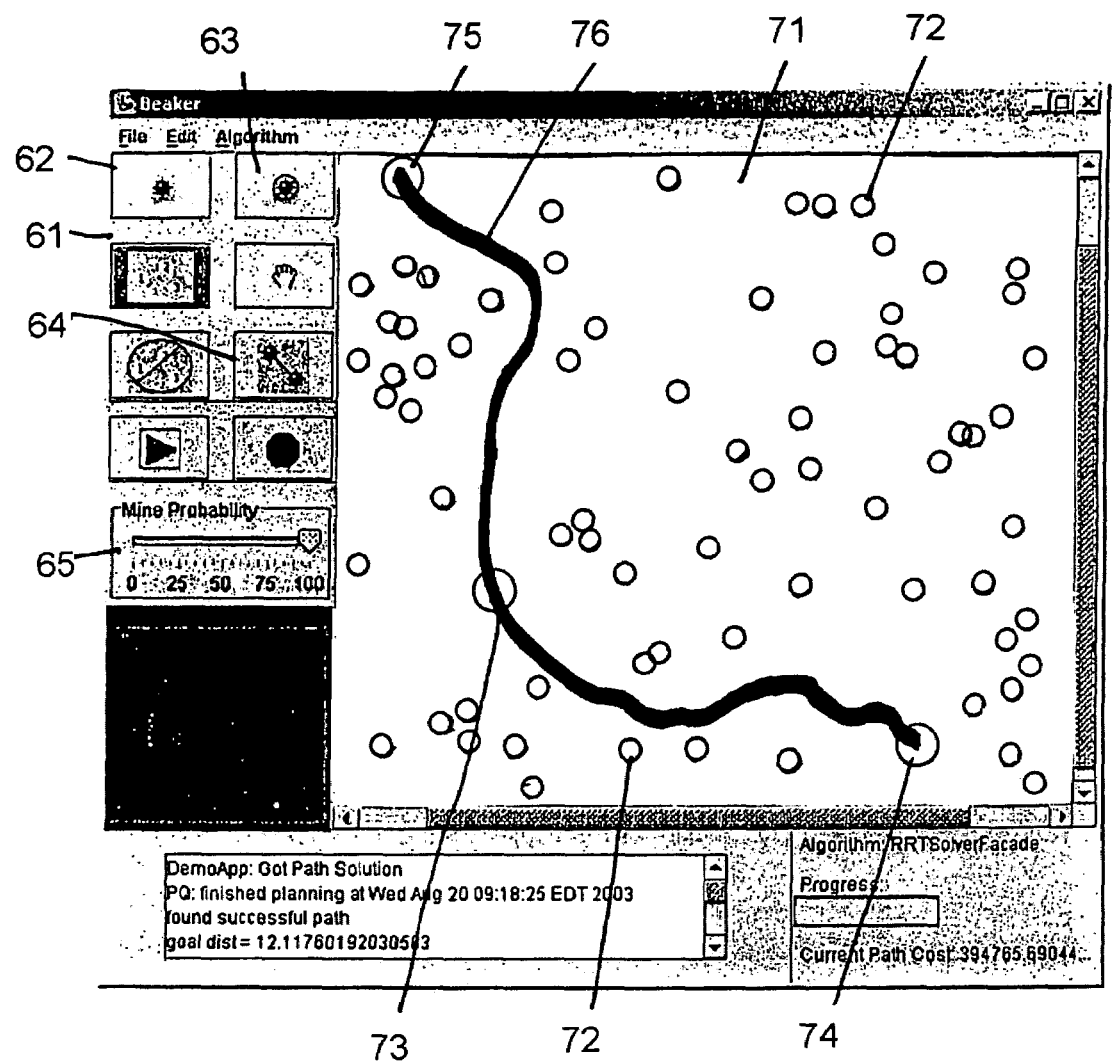
FIG. 2 illustrates the graphical user interface displaying a plan generation.

The GUI uses a component based design and performs in collaboration with the general path planner and the separate GUI components through message passing. Several dialogs are used to perform more complex configurations while the most common actions are laid out in toolbar fashion along the left side of the GUI as illustrated in FIG. 2.

The GUI user is first presented with an area 71 defined by coordinates and representing an open expanse of ocean on which the user may create minefields. The user may place and remove mines 72 on the minefield with mine editing tools 62 and 63 on a tool bar 61. In addition to the manual method of mine layout, the user may generate a uniform random distribution of mines throughout the area 71. Minefields can be saved and loaded from the file menu as well. The toolbar, 61 of FIG. 2, is like that of a typical drawing program, with buttons depicting various tasks that interact with the canvas. The add mine, remove mine, and mine line buttons, 62 through 64 respectively, provide direct manipulation of mines 72 in the field 71. The mine line tool 64 allows the user to click and drag, creating an elongated randomized field of mines. The thickness and density of this line is configured from the mine line preferences dialog accessed from the edit menu. Once the line is dragged on the area map view 71, mines 72 are randomly placed in the box defined by the line=s endpoints and thickness setting. In addition to these direct methods of mine layout, the new minefield dialog in the file menu allows the user to generate a uniform random distribution of mines throughout the area. Minefields can then be saved and loaded from the file menu as well.

The Mine Probability slider, 65, at the end of the toolbar modifies the probability of subsequent mines added to the canvas. The minefield is rendered differently for each algorithm available by a reflectively loaded minefield renderer class. In this way the characteristics of the risk function for each algorithm can be displayed.

Once a minefield is loaded, waypoints 73 can be placed in sequential order from route start 74 to route end 75 using the waypoint tool. The algorithm menu allows the user to select an algorithm for use with the minefield. Here, the options associated with each algorithm are reflectively selected from the algorithm=s implementation of the path planner solver abstract class. The World-View and waypoints generated from the GUI are able to be sent to any of the planners such that multiple plans may be generated for the same minefield. Once the algorithm is properly configured, the start button sends a path query message to the selected planner and a plan is generated. If the show progress check box is activated in the algorithm menu, algorithm-specific progress information will be presented in the navigation box. The progress animation can be saved to disk as a series of images if the option is selected in the algorithm menu. In addition, messages about plan progress will be printed in the lower text window. After the algorithm has completed, the result will be displayed as a route 76 over the area 71. For example, in FIG. 2, the RRT algorithm has produced a plan, 76, which is colored according to the speed of each path segment.

Statistics about the current solution are displayed in the lower right panel. These statistics include the computed risk of the final path found by the algorithm, the time the path would take to follow, and other statistics about the solution.

When the RRT algorithm is implemented as a solver for the general path planner two main code groups are employed, the tree algorithm code group and the models and actions code group. The tree algorithm code group runs the RRT algorithm proper and the models and actions code group determines the state space and robot/ship properties that will be used when running the algorithm.

The tree algorithm code group implements the RRT tree algorithm proper. This algorithm is a space-filling randomized algorithm. The algorithm produces a tree in the state-space of the problem. After each iteration, the algorithm attempts add a node which minimizes the distance from any point in the state space to a point on the tree. Finding the optimal point to add at each iteration exactly is prohibitively expensive, so the RRT algorithm approximates this by choosing a point with some randomness. The pseudocode for the algorithm is as follows:

1. Choose a random point r in state space with some random point generator.
2. Choose the closest existing tree node to r, call it t.
3. For each possible legal extension of the tree from r, find the closest point to t, call it t_0.
4. Add t_0 to the tree.
5. Repeat these steps until the space is filled enough.

For path planning, the tree starts at the starting point of the plan. The algorithm stops when the tree is less than some critical distance to the goal point. Since the tree is rooted at the start point, the path can then be reconstructed by following the ancestors of the node closest to the goal back to the root.

The models and actions code group allows for wide flexibility in the type of path planning done by the RRT algorithm. The model interface is the entity which all models will implement. This interface has three important purposes: 1) defining appropriate geometries for the model, 2) defining a random state space point generator, and 3) selecting the "best" action for a given point in the state space. The RRT code group uses a concrete models methods to build the RRT tree in an appropriate manner.

Actions are model-specific actuations that can be perform and which extend from an abstract class named action. Models are loaded with a set of actions on instantiation. Each concrete action must define what will happen to the state space if the action is applied for a certain amount of time. This is known as the "integration" method.

Three different models for generating obstacle space geometries are available. They are: the ship model, the bull=s eye model and the cone model. The basic ship model uses Java AWT Shape classes to define the obstacles in the minefield as keep-out regions. Mines are added as circular shapes whose radii depend on the probability of the existence of a mine. The greater the probability of the existence of a mine, the greater the radius of the circle defining the obstacle space. It selects the best action by integrating each action over a small unit time and selecting the point closest to the goal point which does not collide with any obstacle. In this model, distance is taken to be the four-dimensional Euclidian distance in planar space and planar velocity.

The bull=s eye model is similar to the ship model except it contains a second, larger set of obstacles superimposed over the smaller obstacles. It has a radius which is a function of the probability of a mine plus an added factor to increase the radius. If no action can be found using the more conservative obstacles, an action is searched for using the more liberal obstacles. Mines are added as a bull's eye of two concentric circles.

Figure 3:
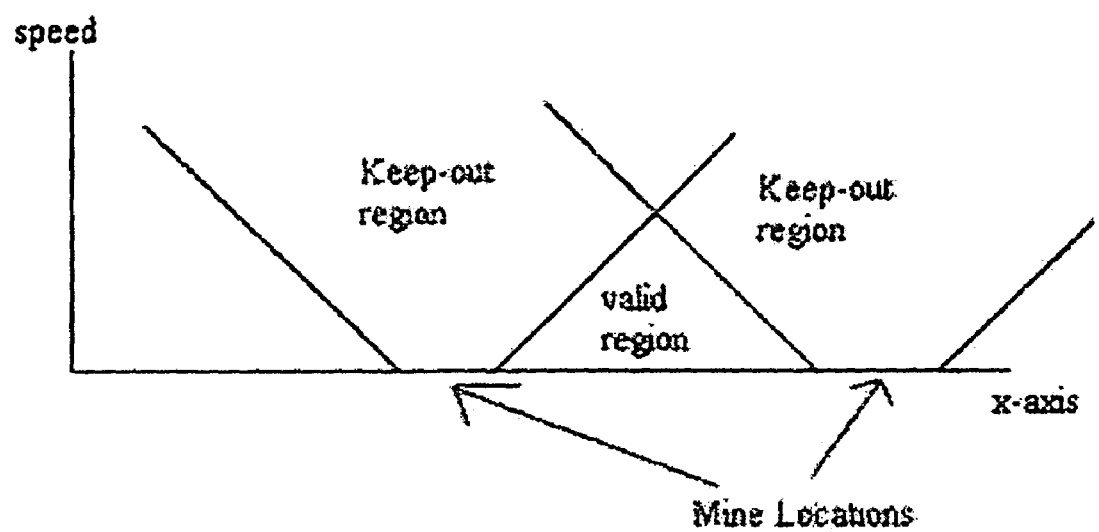
FIG. 3 is a graphic representation of the RRT algorithm cone model.

The cone model uses a half-space of three-dimensional obstacles in the dimensions of x, y and speed. The actions are again checked for collisions with the obstacles, this time in three dimensions. Mines are added as cones with a circle of baseline keep-out region at no speed and a linearly increasing radius as the objects speed increases, see FIG. 3. The baseline keep-out region size depends on the probability of the mine but the cone=s slope is fixed for each instantiation of the model. This model is the default model used in the general path planner.

In an alternate RRT variant using the cone model, when the path gets within a certain distance of the goal, the RRT random point selection is chosen close to the goal. This is the "Goal Directed" RRT variant.

Changing a model's actions dramatically changes the algorithm operation. Two types of actions are available: point-robot actions and ship-like actions. The point-robot actions integrate by applying a simple x-y force. For example, one could create a point-robot action which applies a east-facing force of 10 meters per second squared to the planned object. Ship-like actions take an approximation of rudder position and forward throttle, and integrate an approximate new position using these parameters. With ship-like actions, the turning radius of the generated path, 66 of FIG. 2, may be limited to that of the planned-for object.

The system performs the following steps when generating a route through a minefield:

1) establish the parameters of an area representing a minefield;

2) populate the area with obstacle spaces defined as coordinate bound areas through which the route may not pass;
3) establish the coordinates of a route start point within the area and outside the coordinate bound areas defining obstacle spaces;
4) establish the coordinates of a route end point within the area and outside the coordinate bound areas defining obstacle spaces;
5) generate a series of connected vectors between the start and end points which do not pass through the coordinate bound areas of the obstacle spaces;
6) establish at least one set of parameters defining the coordinates for a waypoint along the route and on one of the vectors;
7) define a path created by the connected vectors as the route through the minefield.

While preferred embodiments of this invention have been illustrated and described,
variations and modifications may be apparent to those skilled in the art. Therefore, we do not wish to be limited thereto and ask that the scope and breadth of this invention be determined from the claims which follow rather than the above description.

What is claimed is:

1. An apparatus for plotting a route through a minefield, comprising:
   a computing means for manipulating algorithms for generating obstacle spaces and a path through said obstacle spaces; and
   a graphical user interface means for inputting data to said algorithms and displaying solutions created by said algorithms,
   wherein said obstacle spaces are circular obstacle spaces with a radii proportional to the probability of the existence of a mine.

2. An apparatus as defined by claim 1, comprising:
   means for controlling said radii of said circular obstacle spaces.

3. An apparatus as defined by claim 1, comprising:
   large circular obstacle spaces concentrically covering said circular obstacle spaces; and
   said large circular obstacle spaces have radii proportional to the probability of the existence of a mine plus a probability increasing factor.

4. An apparatus for plotting a route through a minefield, comprising:
   a computing means for manipulating algorithms for generating obstacle spaces and a path through said obstacle spaces; and
   a graphical user interface means for inputting data to said algorithms and displaying solutions created by said algorithms,
   wherein said obstacle spaces are three dimensional cones having radii about the vertical axis proportional to the speed of transit along said path and said radii equals the probability of the existence of a mine.

5. An apparatus for plotting a route through a minefield, comprising:
   a computing means for manipulating algorithms for generating obstacle spaces and a path through said obstacle spaces; and
   a graphical user interface means for inputting data to said algorithms and displaying solutions created by said algorithms,
   wherein said algorithms include a rapidly-explored random trees algorithm means for calculating said path.

6. An apparatus as defined by claim 5, wherein said means for
   generating said path comprises:
   communication means for providing intercourse between said computing means and said graphical user interface;
   a database containing world objects; and
   a path solver interface means for coupling said means for calculating said path to said database and said communication means.

7. An apparatus as defined by claim 3, wherein said algorithms include a rapidly-explored random trees algorithm means for calculating said path.

8. An apparatus as defined by claim 7, wherein said means for generating said path comprises:
   communication means for providing intercourse between said computing means and said graphical user interface;
   a database containing world objects; and
   a path solver interface means for coupling said means for calculating said path to said database and said communication means.

9. An apparatus as defined by claim 4, wherein said algorithms include a rapidly-explored random trees algorithm means for calculating said path.

10. An apparatus as defined by claim 9, wherein said means for generating said path comprises:
    communication means for providing intercourse between said computing means and said graphical user interface;
    a database containing world objects; and
    a path solver interface means for coupling said means for calculating said path to said database and said communication means.

* * * * *